United States Patent [19]

Sley

[11] Patent Number: 4,457,773

[45] Date of Patent: Jul. 3, 1984

[54] MAGNESIUM PHOSPHATE FLUID FERTILIZER

[75] Inventor: George S. Sley, Fort Pierce, Fla.

[73] Assignee: Charles W. Helzer, Arnold, Md.

[21] Appl. No.: 506,378

[22] Filed: Jun. 21, 1983

Related U.S. Application Data

[63] Continuation-in-part of Ser. No. 363,549, Mar. 30, 1982, abandoned, which is a continuation-in-part of Ser. No. 229,082, Jan. 28, 1981, abandoned.

[51] Int. Cl.$^3$ .......................... C05B 9/00; C05B 11/00
[52] U.S. Cl. ............................................ 71/33; 71/41; 71/43; 71/64.1; 71/64.08
[58] Field of Search ................ 71/33, 41, 42, 43, 64.8, 71/64.1; 423/305, 320

[56] References Cited

U.S. PATENT DOCUMENTS

| T889,024 | 8/1971 | Jones et al. | 423/309 |
| 2,137,674 | 11/1938 | MacIntire | 71/41 |
| 3,459,530 | 8/1969 | Hudson | 71/33 |

FOREIGN PATENT DOCUMENTS 682636  3/1964  Canada .................. 423/309

Primary Examiner—Ferris H. Lander
Attorney, Agent, or Firm—Charles W. Helzer

[57] ABSTRACT

A 0-21-0-9 Mg liquid mixed fertilizer is prepared by adding powdered magnesium hydroxide and an equal amount of water to a dilute solution of phosphoric acid in a plurality of addition steps. A dispersing powder and an emulsifying agent are then added to increase the storage life of the fluidized fertilizer. In a second example dilute sulfuric acid is added to the mixture along with citric acid.

16 Claims, No Drawings

MAGNESIUM PHOSPHATE FLUID FERTILIZER

BACKGROUND OF INVENTION

This application is a continuation-in-part of U.S. patent application Ser. No. 363,549, filed Mar. 30, 1982 which in turn was a continuation-in-part of U.S. patent application Ser. No. 229,082 filed Jan. 28, 1981, both now abandoned.

The field of the invention is Chemistry, Fertilizers and the invention is particularly concerned with acid treatment of fertilizers with phosphoric acids.

According to the present invention, a fluid fertilizer is prepared by mixing magnesium hydroxide with a dilute solution of phosphoric acid.

The state of the art of preparing liquid mixed fertilizers may be ascertained by reference to the Kirk-Othmer "Encyclopedia of Chemical Technology", Vol. 9 (1966) pp. 135-140 and the state of the art of magnesium phosphate fertilizers may be ascertained by reference to U.S. Pat. Nos. 2,137,674; 3,291,594; 3,320,048; 3,620,753; 4,101,637; and 4,175,943, the disclosures of which are incorporated herein.

According to U.S. Pat. No. 3,320,048, ammonia is added to the reaction of magnesium hydroxide and phosphoric acid with magnesium ammonium phosphate as the product.

Dolomite is reacted with phosphoric acid to produce a fertilizer containing magnesium phosphate as disclosed in U.S. Pat. Nos. 2,137,674 and 3,291,594.

A fertilizer containing magnesium phosphate is prepared by reacting dolomite, phosphoric acid and sodium hydroxide according to U.S. Pat. No. 3,620,753.

The difficulties involved in the preparation of soluble mixed fertilizers are outlined in U.S. Pat. No. 4,175,943.

According to the prior art, fluid fertilizers having a non-reactive magnesium source which do not create a chemical reaction in the fertilizer formulation batch tank are unknown. Prior art attempts to add up to five percent magnesium to a fluid fertilizer have been frustrated by having the formulation solidify.

SUMMARY OF THE INVENTION

Having in mind the limitations of the prior art to produce fluid fertilizers having a concentration up to five percent magnesium, it is an object of the present invention to produce such a fluid fertilizer.

Another object of the present invention is to provide a magnesium phosphate fluid fertilizer.

According to the present invention a fluid magnesium phosphate fertilizer is produced by adding to 300 parts by weight 29% phosphoric acid in a batch tank having a high shear agitator in motion, the following components:

(a) 100 parts by weight dry magnesium hydroxide powder;
(b) 125 parts by weight water;
(c) 5 parts by weight TAMOL SN; and
(d) 5 parts by weight TWEEN 80.

The magnesium hydroxide powder is added at a rate of 25 parts during 15 minutes. After the addition of 25 parts of magnesium hydroxide, an equal amount of water is added.

Whenever the batch is observed to tend to solidification, water is added immediately to fluidize the batch.

At the end of one hour of additions, the TAMOL SN and TWEEN 80 are added along with the remainder of the 125 parts of water.

In a second example according to the present invention, a fluid magnesium phosphate fertilizer is produced by adding about 400 parts by weight of magnesium hydroxide mud to a container with agitation and thereafter adding the following components in stages over a period of time:

(a) about 10 parts by weight citric acid;
(b) about 165 parts by weight dilute sulfuric acid;
(c) about 400 parts by weight dilute phosphoric acid;
(d) about 10 parts by weight TAMOL SN; and
(e) about 50 parts by weight hydrated KELZAN.

The dilute sulfuric acid and dilute phosphoric acid are added in interspersed batches over a period of 20 to 30 minutes.

When the reaction cools, the TAMOL SN and hydrated KELZAN are added.

DESCRIPTION OF THE PREFERRED EMBODIMENTS

As identified by the book "Chemical Trade Names and Commercial Synonyms" by William Haynes, TAMOL SN is a product of Rohm & Haas which is identified as a sodium salt of carboxylated polyelectrolyte used as a dispersing powder for pigments and dyestuffs while TWEEN 80 is a product of Atlas Powder identified as a sorbitan monooleate polyoxyalkylene derivative used as an emulsifying agent. KELZAN is a commercial product of the Kelco Corporation of San Diego, Calif. and is xanthane gum derived from kelp or seaweed.

A specific example of carrying out the present invention is given below.

The phosphoric acid source used in the example is 29% $P_2O_5$ but experimentation has proven that a range from 29% to 85.7% $P_2O_5$ can be used. Applicant has found that the higher the percentage of phosphoric acid used the more frequently one must add water to the batch to prevent solidification prior to having the finished product. Four additions of 25 parts of magnesium hudroxide and 25 parts of water made every 15 minutes is the proper order, sequence and timing that one must use in order to obtain the maximum concentration of magnesium in the product in a fluid condition. Any other sequence or timing of additions more frequent than every 15 minutes will solidify the mix thus rendering it unfit for use in fluid fertilizers. One can increase the time interval between addition to any time span desired without having adverse effects on the finished product, however, it is in most cases an economic disadvantage to increase the time interval in the manufacturing process.

A wide selection of dispersing agents and emulsifiers can be used in the present process and most of them are satisfactory, however, applicant has found time and time again that TAMOL SN and TWEEN 80 give superior results.

The batch size used in the specific example is 60 gallons but it can range from 60 gallons to 10,000 gallons without modification of the process as long as one is willing to invest in the engineering necessary to insure proper size stainless steel tanks, pumps, motors, manifolds, pipes, valves, scales, agitators and storage.

EXAMPLE I

A batch tank having a capacity of at least 60 gallons and a high shear agitator mounted therein has 300 lbs of 29% phosphoric acid added thereto. 100 Lbs of dry magnesium hudroxide powder in 4 increments of 25 lbs each are added over a period of one hour. After each 25 lb addition of magnesium hydroxide an addition of 25 lbs of water is made.

If the solution is observed to tend to solidify, additional water is added to fluidize the liquid fertilizer up to a total water addition of 125 lbs of water.

At the end of one hour of additions, 5 lbs of TAMOL SN and 5 lbs of TWEEN 80 are added with sufficient water to bring the total water addition up to 125 lbs.

The product resulting is a non-reactive magnesium fluid fertilizr having up to 9% magnesium without solidification. The designation is 0-21-0-9 Mg or 21% $P_2O_5$ and 9% magnesium.

EXAMPLE II

A. Prepare in advance dilute solutions of phosphoric acid, sulfuric acid and KELZAN and magnesium hydroxide mud as follows:
 (1) Dilute 100 grams of 84% phosphoric acid in 300 grams of water.
 (2) Dilute 66 grams of 66% sulfuric acid in 99 grams of water.
 (3) Hydrate 5 grams of KELZAN with 45 grams of water.
 (4) Prepare 400 grams of magnesium hydroxide mud consisting of about 200 grams of dry magnesium hydroxide powder and about 200 grams of water.

B. Formulate the high magnesium content liquid fertilizer in several steps over a period of time in the following manner:
 (1) Into a clean container having an agitator, place 400 grams of magnesium hydroxide mud and start agitator.
 (2) Add 10 grams of citric acid.
 (3) Add 30 grams diluted sulfuric acid.
 (4) Add 50 grams diluted phosphoric acid.
 (5) Add 10 grams diluted sulfuric acid.
 (6) Add 35 grams diluted phosphoric acid.
 (7) Add 125 grams diluted sulfuric acid.

Up to this point in the formulation, steps (2) thru (7) should take from 20 to 30 minutes.
 (8) When the reaction has cooled add 10 grams of TAMOL SN.
 (9) Add 50 grams of hydrated KELZAN.

What is claimed is:

1. A method of preparing a high magnesium content liquid fertilizer comprising:
 (a) agitating about 300 parts by weight of a 29% to 85.7% phosphoric acid solution;
 (b) mixing about 100 parts by weight of magnesium hydroxide and about 100 parts by weight of water in a plurality of steps with said phosphoric acid solution;
 (c) adding about 5 parts by weight of a dispersing agent to said mixture of (a) and (b);
 (d) adding about 5 parts by weight of an emulsifying agent to said mixture of (a), (b) and (c); and
 (e) adding sufficient water to bring the total water addition to about 125 parts by weight; whereby storage stable magnesium phosphate fluid fertilizer is produced.

2. The method of claim 1, wherein said plurality of steps of (b) comprise four.

3. The method of claim 2, wherein said plurality of steps are carried out in a period of one hour.

4. The method of claim 3, wherein each step comprises the addition of about 25 parts of magnesium hydroxide followed by 25 parts of water.

5. The method of claim 1, wherein the concentration of said phosphoric acid solution is 29%.

6. The method of claim 1, wherein the dispersing agent is TAMOL SN and the emulsifying agent is TWEEN 80.

7. The product of the process according to claim 1.

8. A method of preparing a high magnesium content fluid fertilizer comprising:
 A. preparing in advance dilute solutions of phosphoric acid, sulfuric acid and KELZAN and magnesium hydroxide mud as follows:
  (1) dilute 100 parts by weight of 84% phosphoric acid in 300 parts by weight of water;
  (2) dilute 66 parts by weight of 66% sulfuric acid in 99 parts by weight of water;
  (3) hydrate 50 parts by weight of KELZAN with 45 parts by weight of water; and
  (4) prepare 400 parts by weight of magnesium hydroxide mud consisting of about 200 parts by weight of dry magnesium hydroxide powder and about 200 parts by weight of water; and
 B. formulating the high magnesium content liquid fertilizer as follows:
  (1) into a clean container having an agitator place about 400 parts by weight magnesium hydroxide mud and start agitator;
  (2) add about 10 parts by weight of citric acid;
  (3) add about 165 parts by weight of diluted sulfuric acid;
  (4) add about 400 parts by weight of diluted phosphoric acid;
  (5) after reaction has cooled add about 10 parts by weight of a dispersing agent; and
  (6) add about 50 parts by weight of hydrated emulsifying agent; whereby storage stable magnesium phosphate fluid fertilizer is produced.

9. The method according to claim 7, wherein steps B(3) and B(4) are interspersed with each other over a period of time with the diluted sulfuric acid being introduced in three stages of about 30 parts by weight, 10 parts by weight and 125 parts by weight, respectively, interspersed with introduction of the diluted phosphoric acid in two stages of about 50 parts by weight and 350 parts by weight, respectively.

10. The method according to claim 8, wherein the steps of formulating the mixture under B take place in about 20 to 30 minutes.

11. The method according to claim 7, wherein the dispersing agent is TAMOL SN and the emulsifying agent is KELZAN.

12. The method according to claim 9, wherein the dispersing agent is TAMOL SN and the emulsifying agent is KELZAN.

13. The product of the process according to claim 8.

14. The product of the process according to claim 12.

15. The method of preparing a storage stable high magnesium content fluid fertilizer consisting essentially of the following components added together over a period of time in a batch tank having a high shear agitator in motion comprising:

(a) into batch tank place magnesium hydroxide mud consisting essentially of about 100 to 200 parts by weight of dry magnesium hydroxide powder and about 125 to 200 parts by weight of water and start agitator;
(b) add about 300 to 400 parts by weight of a 28% to 85% dilute phosphoric acid solution;
(c) intersperse with the addition of the dilute phosphoric acid solution about 165 parts by weight of dilute sulfuric acid and 10 parts by weight of citric acid;
(d) after reaction has cooled add about 5 to 10 parts by weight of a dispersing agent; and
(e) add about 5 to 50 parts by weight of an emulsifying agent whereby storage stable magnesium phosphate fluid fertilizer is produced.

16. The product of the process according to claim 15.

* * * * *